US005644632A

United States Patent [19]
Ardon

[11] Patent Number: 5,644,632
[45] Date of Patent: Jul. 1, 1997

[54] DISTRIBUTED KEY TELEPHONE STATION NETWORK

[75] Inventor: Menachem Tsur Ardon, Naperville, Ill.

[73] Assignee: Lucent Technologies Inc., Murray Hill, N.J.

[21] Appl. No.: 485,421

[22] Filed: Jun. 7, 1995

[51] Int. Cl.$^6$ ............................. H04M 7/00; H04M 1/00; H04M 3/00
[52] U.S. Cl. ..................... 379/220; 379/156; 379/165; 379/230; 379/269
[58] Field of Search ................................. 379/113, 133, 379/134, 156, 157, 165, 219, 220, 221, 224, 229, 230, 269, 274, 273, 289

[56] References Cited

U.S. PATENT DOCUMENTS

| | | | |
|---|---|---|---|
| 4,683,584 | 7/1987 | Chang et al. | 379/269 |
| 4,694,487 | 9/1987 | Chang et al. | 379/269 |
| 4,763,353 | 8/1988 | Canale et al. | 379/157 |
| 4,791,662 | 12/1988 | Ahnen et al. | 379/158 |
| 5,101,451 | 3/1992 | Ash | 379/221 |

OTHER PUBLICATIONS

D. L. Carney et al., "Architectural Overview", AT&T Technical Journal, vol. 64, No. 6, Jul.–Aug. 1985, pp. 1339–1356.
J. P. Delatore et al., "Operational Software", *AT&T Technical Journal*, vol. 64, No. 6, Jul.–Aug. 1985, pp. 1357–1384.
D. A. Anderson et al., "Call–Processing Software Structure", *AT&T Technical Journal*, Jan. 1986, pp. 131–152.

*Primary Examiner*—Krista M. Zele
*Assistant Examiner*—Harry S. Hong

[57] ABSTRACT

This invention relates to arrangements for interconnecting a plurality of stand-alone switches by data and communication channels (the latter typically used for communicating voice signals) in such a way as to make the plurality of switches act as if they were one switch. The invention further relates to arrangements for permitting groups of lines, the groups connected to different stand-alone switches, to be treated essentially as if they were connected to a single switch. Each switch of a symbiotic network (a group of stand-alone switches) or a virtual symbiotic network (the grouping of the groups of lines) accesses pertinent data in its own data base or the data base of one of the other switches of the symbiotic or virtual symbiotic network and treats the results of such data base accesses as if they were made internally in the switch. For a symbiotic network the trunks of all the switches of the network going to a common destination (and one such common destination can be any of the switches of another symbiotic network) are grouped into a single group so that an outgoing call can readily be made over a trunk connected to any of the switches of the symbiotic network. Similarly, incoming trunks to any switch of the symbiotic network from a common external source can be grouped into a single trunk group at that external source (which can be another symbiotic network). Advantageously, such an arrangement provides a convenient way of achieving the advantages of a giant switch without requiring the capacity of such a switch and without requiring the geographic concentration of traffic necessary to keep the links to a giant switch reasonably short. Advantageously, a virtual symbiotic network provides an economical and flexible solution to the problem of providing services such as wide area Centrex.

4 Claims, 16 Drawing Sheets

| |
|---|
| PORT IDENTIFICATION |
| OTHER END PORT IDENTIFICATION |
| LINK TO OTHER CONTROL PROCESS |
| LINK TO SUPPLEMENTARY PROCESS |
| LINK TO CONTROLLED PROCESSES |
| CALLED DIRECTORY NUMBER |
| PATH INFORMATION |
| DATA FOR PORT |
| ⋮ |

*FIG. 17*

| |
|---|
| ASSOCIATED PORT |
| PORT CONNECTED THROUGH SWITCH |
| ⋮ |

*FIG. 18*

DISTRIBUTED KEY TELEPHONE STATION NETWORK

CROSS-REFERENCE TO RELATED APPLICATION

This application is related to the applications of:

Menachem T. Ardon entitled "Improved Telecommunications Network" bearing U.S. patent application Ser. No. 08/485,422;

Menachem T. Ardon entitled "Improved Customer Oriented Telecommunications Network" bearing U.S. patent application Ser. No. 08/485,423, now U.S. Pat. No. 5,583,929; and Menachem T. Ardon entitled "Improved Trunk Utilization In A Telecommunications Network" bearing U.S. patent application Ser. No. 08/485,927 which applications are assigned to the assignee of the present application, and are being filed concurrently herewith.

TECHNICAL FIELD

This invention relates to improved methods and apparatus for establishing inter-office telecommunications calls, and more specifically, for completing calls in a distributed key telephone system.

PROBLEM

A recent trend in telecommunications networks is the demand for more and more features and services of a type requiring more than the simple connection of two customers, the called customer being specified by a directory number that directly specifies the switching system serving that customer. Examples include 800 service wherein location of the called party is specified by a data base which converts an arbitrary 800 number into a conventional switch specified number; calls to large automatic call distributor systems wherein a given directory number may be served by agents in many locations, complex Centrex arrangements featuring call forwarding wherein the first number is called but the calls are automatically rerouted to a second number, shared directory service wherein a call is completed to whichever of two or more telephones (for example, a cellular phone and a home telephone or a group of key telephone stations) answers first, screened calls wherein only outgoing calls to certain destinations or incoming calls from certain sources are completed; and many others.

Many of these situations are handled through the use of intelligent networks and advanced intelligent networks, networks which rely on a data base shared by many switches for helping to route calls properly. The requirement to access a data base on all calls of a certain class presents problems in maintaining a reliable data base and in delaying all calls for the query of such a data base. Another class of problems is encountered in trying to meet requirements for highly reliable service and in utilizing expensive resources such as speech recognition systems which are not always efficiently utilized within one switch.

The limitations of a switch are usually determined by the capacity of the switch, the traffic which can be conveniently gathered in one location, and the degree of community of interest among the telephone customers in a particular geographic area. For a particular customer, the community of interest may be spread over more than one geographic area. This size may not be appropriate for efficient inter-switch communications (the size of the trunk groups may be too small); for efficient utilization of expensive resources such as data bases dedicated to switch or speech recognition systems; or for the effective deployment of operation administration and maintenance systems (switching systems may be too small to justify a modern sophisticated Operations, Administration and Maintenance (OA&M) system.

A problem of the prior art is that the size of the switching system may be inconsistent with other factors for giving the most economic service in the face of requirements for sophisticated services.

SOLUTION

The above problems are significantly alleviated and advances made over the prior art through the use of a symbiotic network, i.e., a cluster of interconnected switching systems which appear to the outside world including both the connected customers and the connected public switch telephone network, as a single switch. From the point of view of features offered to each calling customer and each incoming call and features offered to each called customer or each outgoing call, communications between members of the cluster and treated as if they were intraswitch communications through the use of interswitch signaling capabilities for accessing what is normally considered intraswitch information, such as the data base of a single switch, or the control process of a call, between switches of the cluster. A virtual symbiotic network seeks to provide most of the advantages of a symbiotic network to a preselected portion of the subscribers connected to a plurality of switches. Typically, the portions of subscribers which are associated via such a virtual symbiotic network are the lines of a single customer, for example, an area wide Centrex customer whose lines are served by many switches in different geographic locations. Virtual or real data circuits are provided among the switches of a virtual symbiotic network in order to provide access from one switch to the data of another switch in essentially the same manner as data circuits are provided and used in a symbiotic network. However, the voice connections among the switches of a virtual symbiotic network are made through the public switched telephone network or through conventional connections or private connections among these switches.

In accordance with one aspect of the invention, if a call is received in one switch of a symbiotic network, and that switch recognizes that the call is to be terminated in another switch, the first switch accesses translation information for the terminating customer through the use of a message sent prior to establishing a connection to the terminating switch serving that terminating number. The message is sent over a data channel; one example of such a data channel is a data channel of a common channel signaling system. The result of such a request for information is that the first switch may find that the call is to be forwarded, that the call is to a multi-line hunting group having members in several switches or that the call is to a telephone that is a part of a key telephone system having extensions in several switches, or that the called party is busy and no call forwarding or call waiting can be invoked. Based on the information that the first switch receives, a busy signal can be returned, or the call can be established to the second switch, to another switch, or the call can be established to a switch and additional messages required for operating key telephone system displays be sent to other switches.

In accordance with another aspect of the invention, only one controlling process is associated with the ingress switch and only one controlling process is associated with the egress switch for calls within a symbiotic network. Controlled processes are used only for controlling the ends of a connection that do not go to any telephone stations or to a trunk connecting the symbiotic network with the rest of the telecommunication network. Interswitch connections within a symbiotic network are established by treating these as effectively temporary nailed up connections (i.e., permanent connections), subject only to the control from the two ends of the symbiotic network connection. No control processes are required to control the status of each end of the interswitch communication paths of the symbiotic network because that control resides in the originating or incoming process connected to the originating telecommunication station or incoming trunk and the terminating or outgoing process associated with the terminating telecommunication station or outgoing trunk. For a virtual symbiotic network, the primary control remains with the two processes at the end of the connection, but intermediate processes can be used to control connections over trunks of the public switched telephone network.

In accordance with one aspect of the invention when a call comes into one switch of the cluster, that switch either directly accesses the busy idle information for that call or sends a query to the switch that serves the called customer. If the called customer is busy and has no call waiting service, busy tone is returned via the switch that originally received the call. Control of the connection within the cluster is shared between the switches of the cluster in contrast to the situation wherein a call is controlled only by the two end switches of the call.

In one specific application, a group of secretaries serving a group of principals is normally combined into a key telephone system which may, in turn, be part of a Centrex. In order for the secretaries to serve their principals effectively, the secretaries need a display indicating which telephone stations are currently busy, are currently being alerted so that they may answer incoming telephone calls, and be certain that if they are making an outgoing call, no one else will seize the same outgoing telephone line. If a symbiotic or virtual symbiotic network serves this boss/ secretary group, then as long as all secretaries and all bosses are connected to a switch of the symbiotic or virtual symbiotic network, the telephone displays can be continuously updated.

In accordance with one feature of the invention, a station may be effectively treated as if it were connected to a symbiotic network even if it is connected to switch that is not part of the network, i.e., a switch connected to the symbiotic network by trunks through the public switched telephone network. Effectively, that line is on a virtual symbiotic network that is an enlargement of the main symbiotic network serving the other stations.

BRIEF DESCRIPTION OF THE DRAWING

FIG. 17 illustrates the data of an ingress or egress process of a symbiotic network; and FIG. 18 illustrates the data of a controlled process of a symbiotic network.

DETAILED DESCRIPTION

Figure 1:
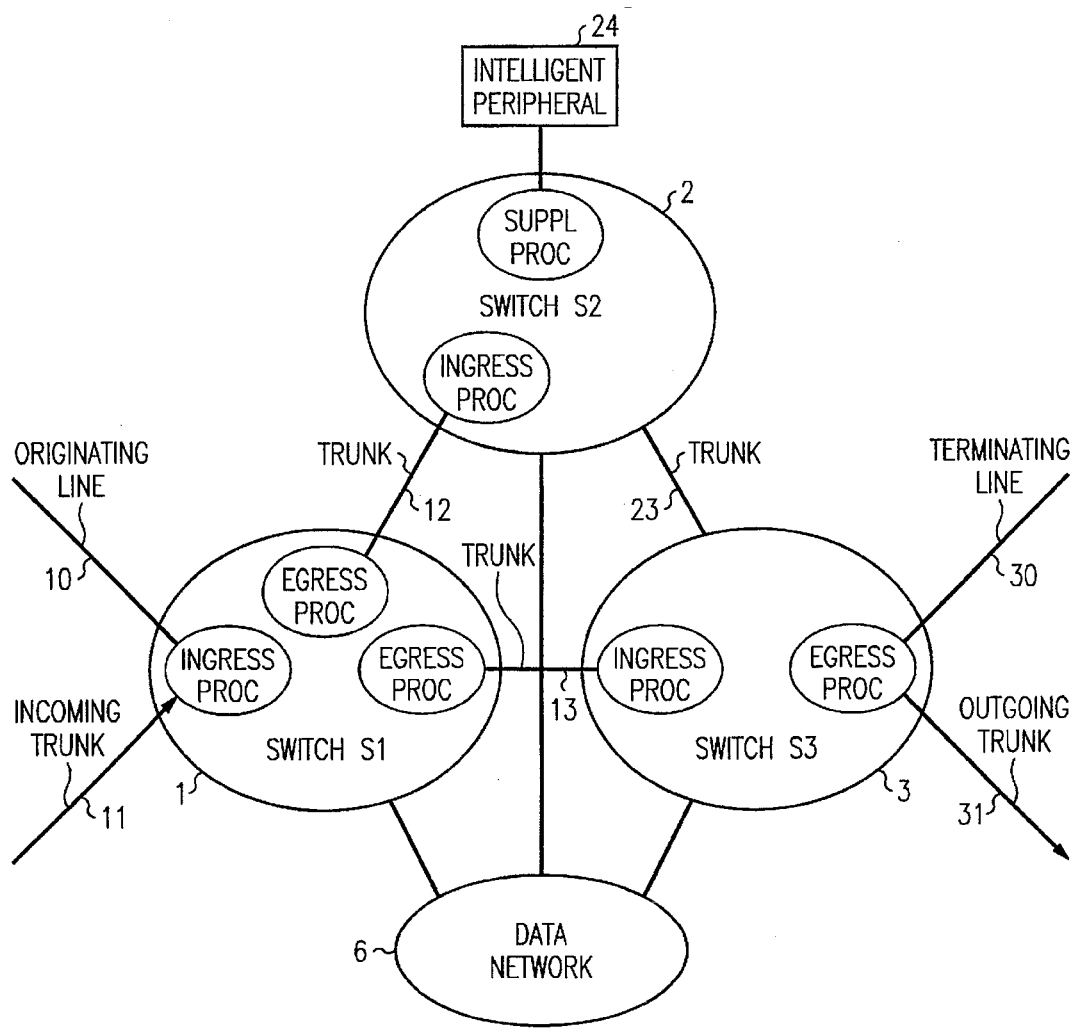
FIG. 1 is a block diagram of a network in accordance with the principles of the prior art.
Figure 2:
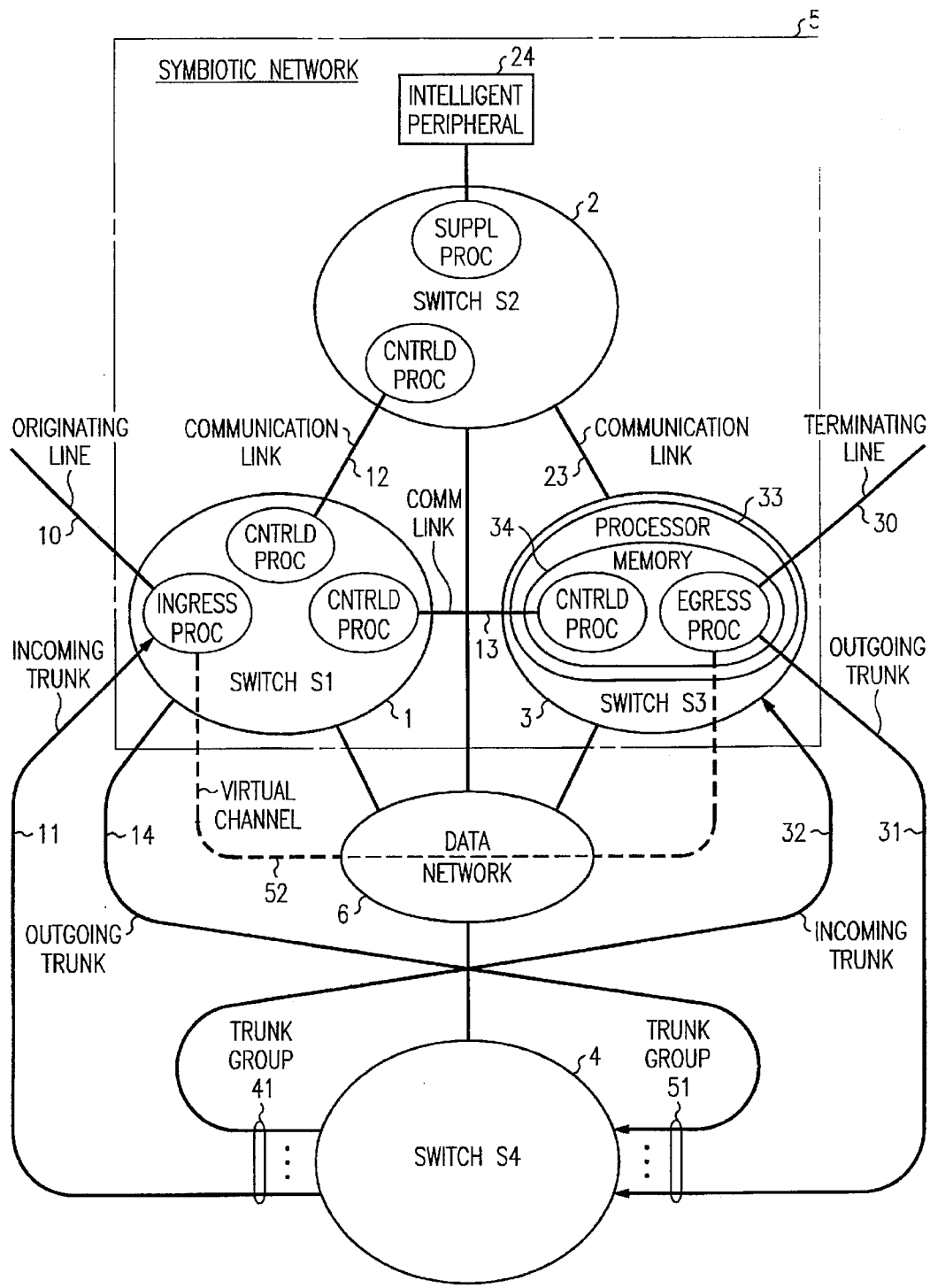
FIG. 2 is a block diagram of a symbiotic network and a connected switch.

FIG. 1 shows the treatment of the call in the prior art and FIG. 2 shows the treatment of the call in accordance with the principles of applicant's invention. A symbiotic network acts as if it were a single switch such that all calls from any line or trunk connected to the network to any other line or trunk connected to the network is treated as if it were a call from a line or trunk connected to a single switch to another line or trunk connected to the same switch. In such a network, it is desirable to permit the switches connected to the incoming trunk or originating line to have access to all information required for establishing a call, and to give the same access to the switch connected to the outgoing trunk or terminating line. Lines and trunks are each terminated on a port of the switch.

FIG. 1 is a block diagram illustrating call processing in the prior art. Shown in FIG. 1 are three switching systems (switches), S1, S2, and S3. Trunk group T12 connects switches S1 and S2, T23 connects S2 and S3, and T13 connects S1 and S3. An incoming trunk 11 and originating line 10 connected to S1 are served by an originating process or an incoming process. To clarify subsequent descriptions herein, these are referred to as ingress processes. If an originating or incoming call is recognized as being a call that terminates on switch S3, then an egress process is established and is used to control the call from the S1 side of one of the trunks in trunk group T13. All three switches are connected to a data network 6, which is used to communicate signaling messages between the switches. When switch S1 wishes to establish a call which terminates on switch S3, then switch S1 sends a data message to S3 identifying the trunk selected for that call and the terminating party of that call. Switch S3 then establishes an ingress process associated with the other end of the selected trunk from trunk group T13. S3 treats this as an incoming call, S3 establishes a connection, for example to terminating line 30, and associates with that terminating line an egress process for controlling the terminating end of the connection within S3.

A process is a block of memory used to store all information necessary to control some part of a call and is also the software necessary for interpreting this information and for controlling the call accordingly. Systems such as the 5ESS® switch, manufactured by AT&T Network Systems, have an ingress process and an egress process for all calls within a switch. The ingress process performing incoming or originating functions, and the egress process performing terminating or outgoing processes. (As indicated above, the term ingress and egress process may actually represent two different types of processes.)

Lines and trunks are connected to ports of a switching system. Each ingress or process is associated with a port and controls call processing for that port.

FIG. 1 also illustrates a call according to the principles of the prior art. The call is to a group, such as a Centrex, whose lines are spread over three switching systems, S1, S2, and S3. In accordance with the principles of the prior art, as illustrated in FIG. 1, the call happens to be received in switch S1, which is closest to the originator of the call. Switch S1 does not serve the terminating line (30), nor does it have the information necessary to determine where line 30 is located. Instead, it has the information that switch S2 can be used to access, directly or indirectly, the lines of the terminating Centrex. Switch S1 therefore establishes a call to switch S2 and, essentially, switch S1 acts as a tandem switch in the connection.

Switch S2 has a table indicating the location of all the lines in the Centrex. When switch S2 receives the call, it consults this table and determines that the desired terminating line is line 30 located on switch S3. Switch S2 therefore establishes a connection to switch S3. Again, switch S2 acts as a tandem switch. In this case, switch S1 and switch S2, each acting as a tandem switch, each have control of the call using an incoming process and an outgoing process.

Finally, when the call reaches switch S3, the latter receives a call from an incoming trunk (incoming from switch S2) and the call is destined for line 30 on switch S3. From the point of view of switch S3, therefore, this is an incoming call and is controlled by an incoming process associated with the incoming trunk and a terminating process associated with the called line 30.

Note the characteristics of this arrangement for switching calls. Each switch depends upon its own data base and its own status information, indicating which lines and which trunks are available and which ones are busy, and each switch has full control of calls set up in that switch.

FIG. 2 similar in general format to FIG. 1, illustrates the differences between switches S1, S2, and S3 acting as independent switches and switches S1, S2 and S3 acting together as a symbiotic network. The switches are connected by communication link groups C13, C12, and C23. The communication links in these groups being totally under the control of the switches in the symbiotic network can be simplified to provide only the most rudimentary communication signal transmission functions. For the purpose of this description, the term "switch" means a stand-alone switching system with an internal Stored Program Control Processor and a communication network for interconnecting lines served by the switch, trunks served by the switch, and communication links to other switches of a symbiotic network. A connection between incoming trunk 11 and terminating line 30 has only 1 ingress process in switch 1 one egress process in switch 3. The egress process in switch 1 and the ingress process in switch 3 have been replaced by controlled processes. Each end of a communication path within the symbiotic network 5 is associated with a controlled process which contains only the most rudimentary information required to keep up the communication path. The ingress and egress processes perform all control functions for the call and cause the controlled processes to be established or terminated as required. A supplementary process is still associated with a connections to intelligent peripheral IP 24. The controlled processes are only for controlling the two ends of the intra-symbiotic network communication paths.

Contrast the process of establishing calls in the arrangement of FIG. 1 with the process using the arrangement of FIG. 2, in which the call is set up in accordance with the principles of applicant's invention.

The switches of FIG. 1 and FIG. 2 are all program controlled switches. This is shown in switch S3 of FIG. 2 which contains a processor 33, which in turn includes a memory 34. The memory contains a program for controlling operations of the switch, contains data about the ports and the routing for the switch, and contains dynamic data such as the processes. The line between the process and the line or trunk represents the control exercised by the process, acting under the control of the program, on the line or trunk.

An originating or incoming process is assigned to control one end of a call in a symbiotic network, and a terminating or outgoing process is assigned to control the other end of a symbiotic network connection. The processes are entirely analogous to comparable processes within a single switch in the prior art. As will be explained further, these processes perform the same functions in a symbiotic network as their counterparts perform in a single switch except that the way in which they perform these functions requires data message access to send control messages, data request messages, and data response messages among the individual switches of the symbiotic network.

The call is also received in switch S1. However, switch S1 instead of simply passing the call on to switch 2, makes an inquiry of switch S2 to determine where the call is to be terminated. Switch S1 has previously determined from its own data base that the terminating number is the number of a Centrex whose descriptive table is to be found in switch S2. In response to the information obtained from switch S2, switch S1 now knows that the call is to be terminated on a line in switch S3. Switch S1, under the control of the incoming process of the call, then checks switch S3 to determine the equipment location of the terminating line and to determine whether that line is busy. A "busy" test in this case includes a check of whether the line has call waiting service; a line with call waiting service is not considered busy unless the line already has a waiting call. If the line is not busy, switch S1 commands, via the same or a subsequent signaling message, that the line should be seized and marked busy so that no intervening calls are completed to that line. Switch S1 then controls the process of selecting facilities for interconnecting switch S1 and switch S3. If communication paths are available between switch S1 and switch S3, then one of these communication paths is seized and switch S1 orders that a connection be established within switch S1 between the incoming trunk and the communication path and in switch S3 between the communication path and the terminating line. Alternatively, a path can be reserved until the terminating station answers in response to a ringing signal, thereafter, the reserved path is established. If no communication path is available between switch S1 and switch S3 because all such paths are busy, switch S1 searches for possibilities of establishing a connection to switch S3 via another switch. In this case, switch S1 has available access to switch S2 via a communication path and queries switch S3 for information as to the availability of a communication path connecting switches S3 and S2. (Such information may have been returned earlier from switch S3, e.g., along with the response that the called line 30 is available.) Switch S1 then sends a command to switch S2 to establish an unmonitored connection between a communication path in C12 joining switches S1 and S2, and a communication path in C23 into connecting switch S2 and switch S3. This connection in switch S2 is under the control only of the process associated with the incoming trunk in switch S1 and the terminating line in switch S3 and is disconnected only in response to a request from one of these processes. (This is the normal condition; in addition, audit programs and craft requests may also take down the connection in case of trouble.)

Switch S1 then requests switch S3 (either through a direct request or through a request made to the terminating process which has been activated in switch S3 following the busy test of line 30 and the recognition that this line is available and should be seized for the call requested by the incoming process from switch S1) to cooperate in establishing the path. The terminating process monitors for answer and transmits an answer message to the incoming process in switch S1. Switch S3 detects a called party disconnect, and passes a message to switch S1 and responds to a calling party disconnect message from switch S1 by disconnecting line 30. The ingress and egress processes communicate via a virtual channel 52 set up between these processes and transmitted over data network 6.

One of the advantages of a symbiotic network is that the size of the trunk groups, connecting the symbiotic network with the rest of the public switched telephone network, can be made much larger. Effectively, all outgoing trunks from the symbiotic network to another destination, and one such destination may be a complete symbiotic network comprising a plurality of switches, can be combined into a single trunk group for trunk hunting purposes. Similarly, all the incoming trunks from a single source, and one such source may be a complete symbiotic network, can form a single trunk group for trunk hunting purposes; since the destination switch of any outgoing trunk must be known to the signaling system of the source switch of what is an incoming trunk to the symbiotic network, the source switch must know the destination switch of each such outgoing trunk within the group, unless a single signaling recipient forwards signaling messages to the right switch within the symbiotic network based on the trunk address. In FIG. 2, switch S4 outside the symbiotic network 5, is connected to outgoing trunks 14 and 31 from switches S1 and S3, respectively, trunks 14 and 31 being part of a single group 51 for trunk hunting purposes. Similarly, incoming trunks 11 and 32 are connected from switch S4 to switches S1 and S3 respectively and these two trunks are part of a single group 41 for trunk hunting purposes in switch S4.

FIG. 2 shows the switches of the symbiotic network interconnected by a data network 6 for the purpose of exchanging data and control messages. This generalized network may have a plurality of dedicated links and/or a dedicated subswitch for handling the greater volume of message traffic among the switches. The ingress and egress processes of a symbiotic network connection conveniently communicate over the data network using a virtual channel.

The above example illustrates a number of the principles used by applicant in this embodiment to treat all calls served by the symbiotic network as if the calls were served within a single switch. If information is not available in a switch, but is available in another switch, the normal process is to send the call to the second switch in accordance with applicant's invention. A query is made by a common channel signaling message and the controlling process thereby obtains the information which it would otherwise obtain directly within the switch if the symbiotic network were a single switch. Further, a single originating or incoming process and a single terminating or outgoing process is used to control the call instead of having control relayed through a group of incoming and outgoing processes. Third, the communication channels interconnecting the switches of the symbiotic network are simple paths and do not require the normal signaling of information that is required for controlling tandem calls. That signaling need only be exchanged between the switch that contains the originating or incoming process and the switch that contains the outgoing or terminating process.

For certain calls it may be necessary to temporarily connect a unit such as Intelligent Peripheral 4 (IP 24) to a call in order to collect information from a caller or called party. One such intelligent peripheral is a speech recognition unit which in response to prompts to a caller, receives speech information from the caller an converts this speech into data possibly for transmission by data messages to another switch for controlling a connection. Since intelligent peripherals are relatively expensive, they may not be connected to every switch of a network especially if, as in the case of speech recognition units, a common control is used for a plurality of individual speech recognition units. If such an intelligent peripheral has to be connected to a call, then a separate connection to that intelligent peripheral is established in this case over one of the trunks of trunk group T12. The connection is under the control of the original ingress process and egress process in switch S1 connected to one side of the selected trunk in trunk group T12. An ingress process in switch S2 connected to the other side of that trunk and a supplementary process in S2 for controlling the intelligent peripheral IP 24. Note that in this as in other cases, an ingress process and an egress process or an ingress process and a supplementary process are associated with every connection within a switching system.

Suppose that prior to establishing the call it was necessary to provide the caller with an announcement and to recognize speech commands by the caller. Suppose, further, that the prompting equipment and speech recognition equipment were sufficiently expensive that it was not available in switch 1. In the prior art (FIG. 1), the call would be connected via a switch, such as for example switch 2, which has available such equipment. In accordance with the principles of applicant's invention, this is not necessary. Instead, a connection is set up between switch S1 and switch S2 for the duration of the time required to perform the prompts and recognize the spoken commands by the caller. This act would be under the control of an auxiliary process in switch S2 and after the commands had been recognized, switch S2 would send a message over the common channel signaling network indicating what command had been supplied by the caller. This is the equivalent of setting up a connection within switch S1 to such equipment (which does not exist in this case) and having the auxiliary process which controls the speech processing equipment communicate within switch S1 to the controlling incoming or originating process. When the speech processing equipment is no longer needed on this call, the communication path between switch S1 and switch S2 can be released, as can the connections in switch S1 and switch S2 to that communication path to allow the caller to be connected to the speech processing equipment. As discussed hereinafter, the Intelligent Peripheral may be connected to a switch or a symbiotic network outside this symbiotic network. The ingress process and supplementary process communicate via a virtual channel set up between these processes and transmitted over data network 6.

In some cases, the switches of a symbiotic network may be in fairly close geographic proximity. It is then possible and desirable to provide emergency linkages among the switches to provide, for example, a back-up clock from one switch to another. Similarly, back-up data links may be provided through the use of the data links of another switch. Emergency access to E911 emergency service can be routed through an alternate switch of the symbiotic network.

Figure 3:
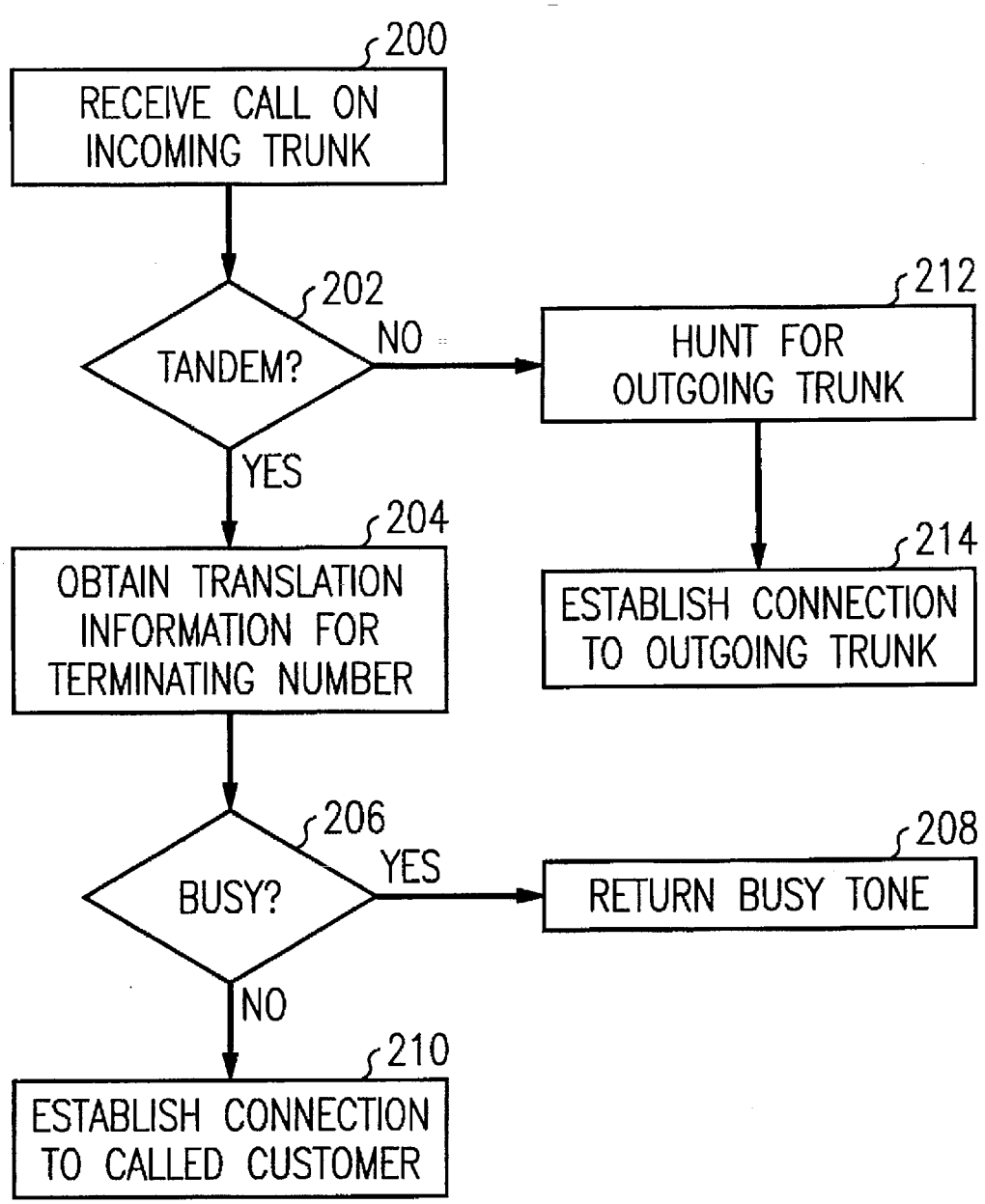
FIG. 3 illustrates the reception of a call in a symbiotic or virtual symbiotic network.

FIG. 3 illustrates broadly how a symbiotic network operates. Action block 200 shows that a call is received on an incoming trunk. Test 202 is used to determine whether the call is tandem for this symbiotic network, i.e., whether the destination specified on the call received on the incoming trunk is a destination connected to a switch outside the symbiotic network. If the result of test 202 indicates that this is not a tandem call, i.e., that the call can be terminated within the symbiotic network then translation data is accessed for the terminating number (action block 204). This type of data access is further described with respect to FIG. 4. Next, the line associated with the terminating number is tested for busy including the check for call waiting service in which case "busy" means "busy" and one call waiting (test 206). The busy test is another example of the general type of data access used within a symbiotic network. If the line is not busy then a connection is established to the called customer (action block 210). The connection may be direct or may be reserved in the case of call waiting. This type of connection is described with respect to FIG. 6. If the line is busy and the busy tone is returned (action block 208) in this case directly from the trunk the switching system connected to the incoming trunk.

Figure 9:
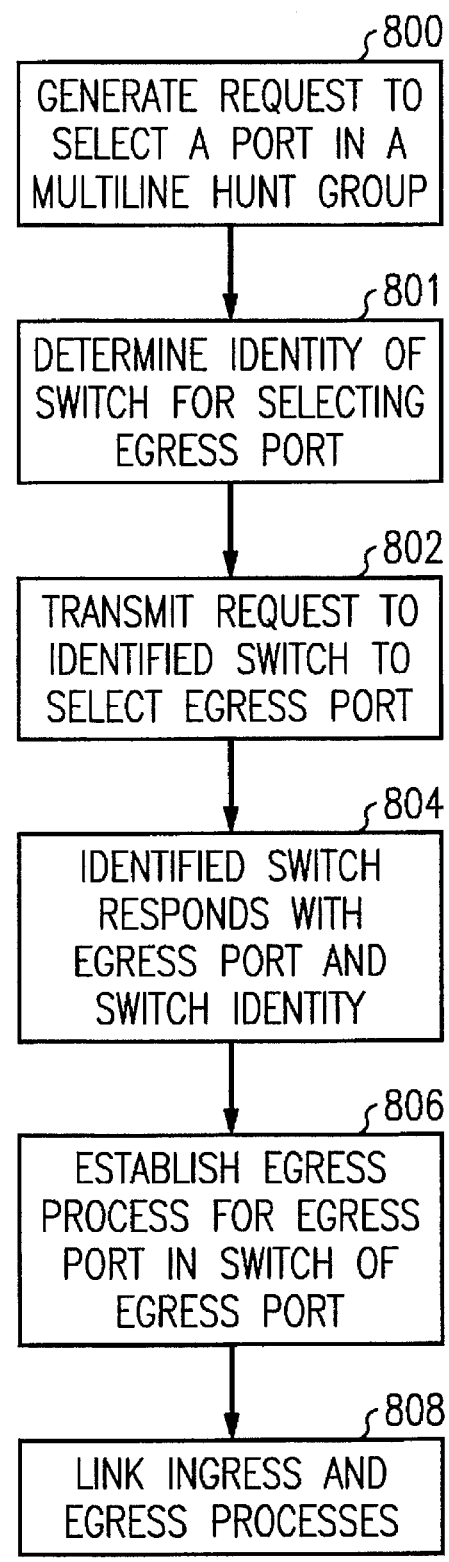
FIG. 9 illustrates the process of selecting a port of a multi-line hunt group.

The process of obtaining translation information for the terminating number may include a hunt for an available line in a multi-line hunt group, as described with respect to FIG. 9. In this case, the translation information includes data for the selected available line (or a busy indication if no lines are available).

If this is a tandem call then a hunt for an outgoing trunk is performed (action block 212). As will be described with respect to FIG. 8, this hunt can include any outgoing trunk in the symbiotic network. Finally a connection is established between the incoming trunk and the outgoing trunk (action block 214). This connection establishment process is described with respect to FIG. 8.

FIGS. 4–9 are flow diagrams illustrating how symbiotic network functions, comparable to simple intraswitch functions in the prior art, are carried out.

Figure 4:
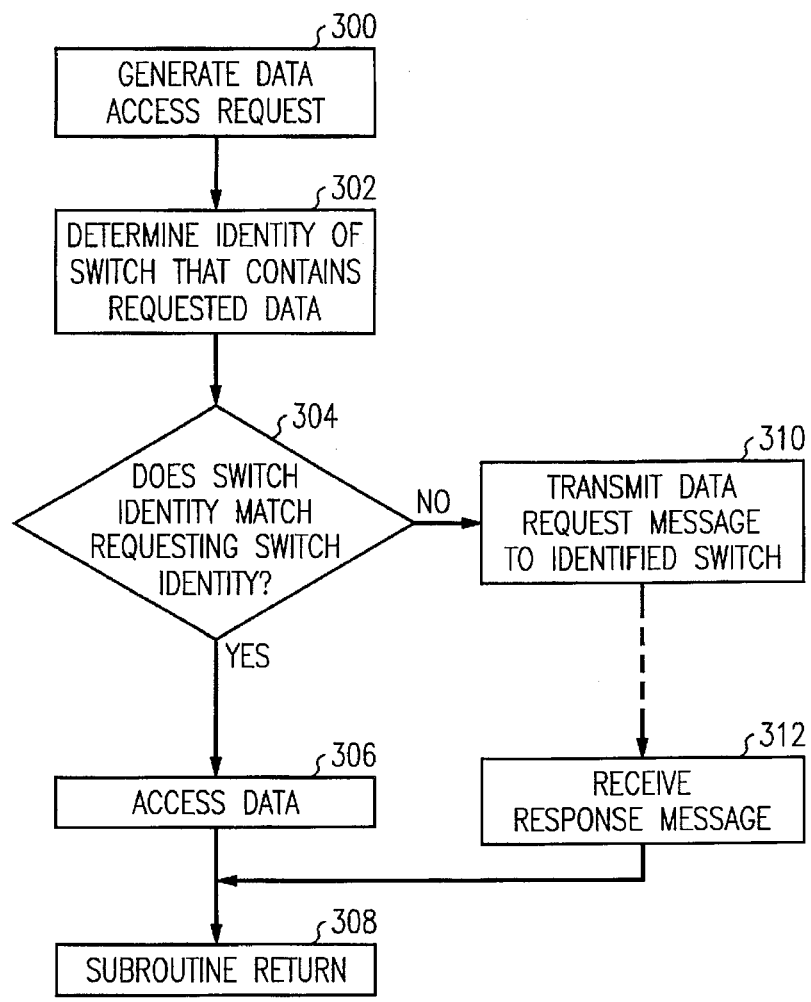
FIGS. 4 and 5 illustrate the method of accessing data within a symbiotic or virtual symbiotic network.
Figure 5:
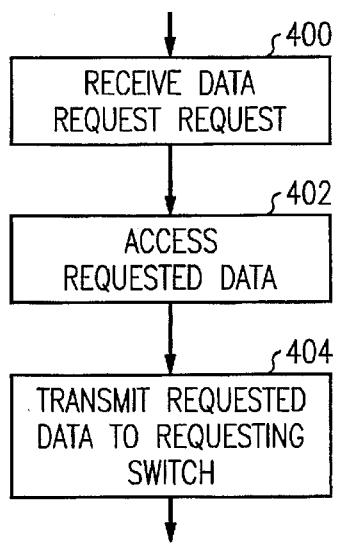

FIG. 4 illustrates a simple data access subroutine. The subroutine starts with the generation of a data access request (action block 300). The identity of the switch that contains the requested data is then determined (action block 302). In the symbiotic network it is necessary that each switch contain the information necessary to determine directly or indirectly which switch has the needed data. For example if the data access request is a busy test, then each switch must contain information indicating which switch serves the terminals of each directory number or it must contain information identifying another switch or data base that contains that information in a particular case. (If the latter is true then the determination of the switch effectively is another subroutine similar to the subroutine of FIG. 4 for accessing data.) Once the switch has been determined, test 304 is used to identify whether the switch containing the requested data is the same as the switch which generated the data access request. If so, the data is accessed in accordance with the principles of the prior art and the data access subroutine returns to the requesting program. If the identified switch is not the switch that generated the data access request, then a data request message is transmitted to the identified switch (action block 310). This data message contains the identity of the requesting switch, some link such a request number to allow a return message to be associated with the requesting data subroutine, and the identity of the switch requesting the data. The switch receiving the data request message, performs the program whose flowchart is shown in FIG. 5 and returns a message which is received by the requesting switch (action block 312). Once the response message is received, the data requesting subroutine may return to the data requesting program.

While in the preferred embodiment, a particular segment of office data is generally stored in one switch and accessed therefrom by other switches, it is also possible to replicate such data to reduce the number of interswitch data access operations. This would be desirable if interswitch data access were relatively slow and the extra memory relatively inexpensive. Dynamic data, such as call processing data, cannot generally be replicated because of the high cost of the resources required to continuously update such replicated data.

FIG. 5 illustrates what happens when a switch receives a data request message (action block 400), accesses the requested data (action block 402), and transmits the requested data to the requesting switch (action block 404). In the return message is an identification, previously discussed, to associate the return message with the requesting subroutine.

Figure 6:
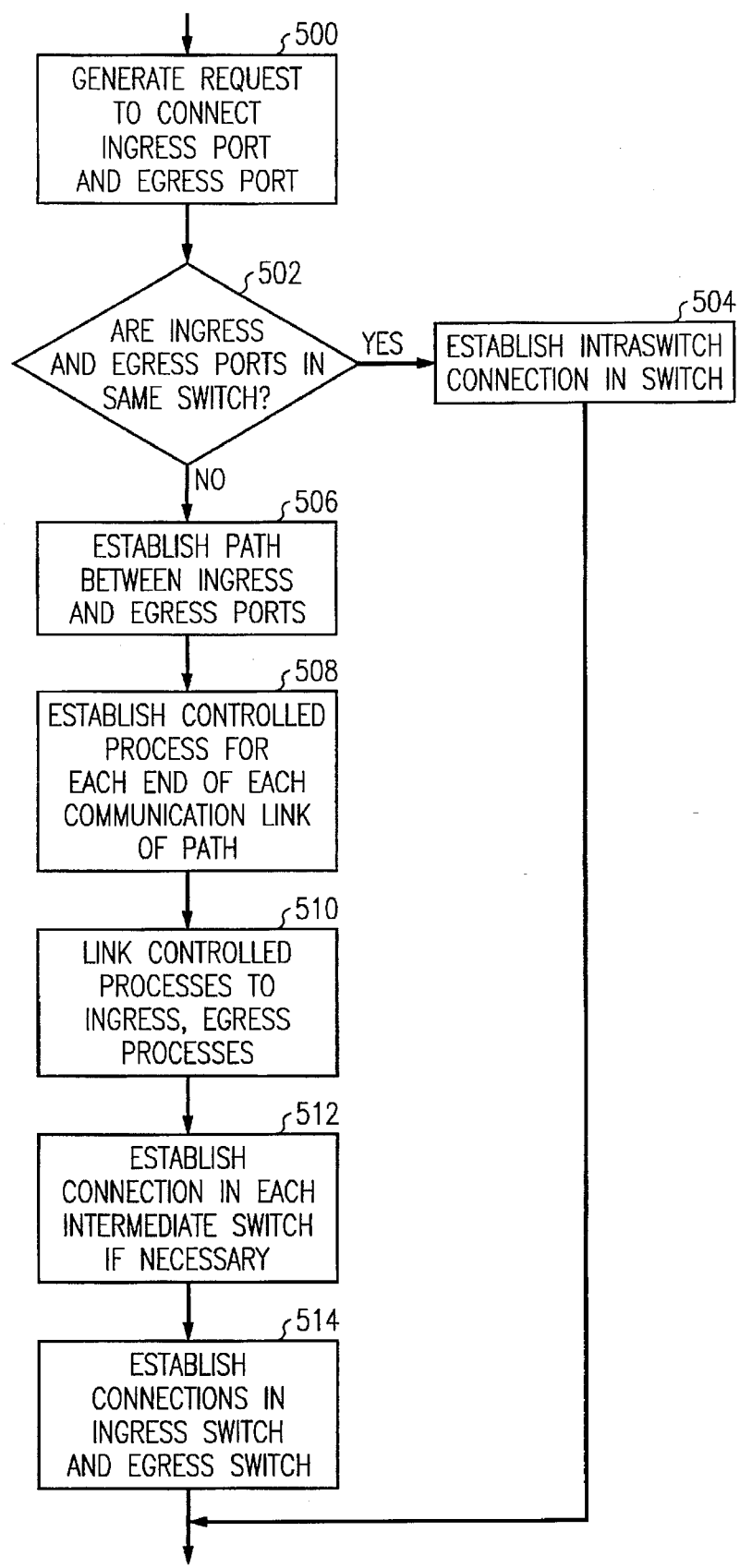
FIG. 6 illustrates the process of establishing a connection within a symbiotic network.

FIG. 6 illustrates the general process of establishing a connection within the symbiotic network. The program is started when a request is generated to connect an ingress port and an egress port (action block 500). An ingress port is connected either to an originating line or to an incoming trunk. An egress port is connected either to a terminating line or an outgoing trunk. Test 502 is then used to determine whether the ingress port and the egress port are on the same switch. If so, then an intraswitch connection is established (action block 504) in the conventional manner of the prior art. If the ingress and the egress port are not on the same switch, a path is selected between the ingress and the egress port (action block 506, further expanded in FIG. 7). After the path has been selected, a controlled process is established for each end of each communication link of the path (action block 508) and the controlled processes are linked to the ingress and egress processes (action block 510). Next, connections in each intermediate switch of the connection are established if necessary (action block 512). Such a connection is necessary if the path includes not only an ingress switch (connected to the ingress port) and an egress switch (connected to egress port) but also includes an intermediate switch. Finally action block 514 is used to establish connections in the ingress switch between the ingress port and the port connected to the ingress switch controlled process, and in the egress switch between the egress port and the communication link associated with the controlled process in the egress switch.

Figure 7:
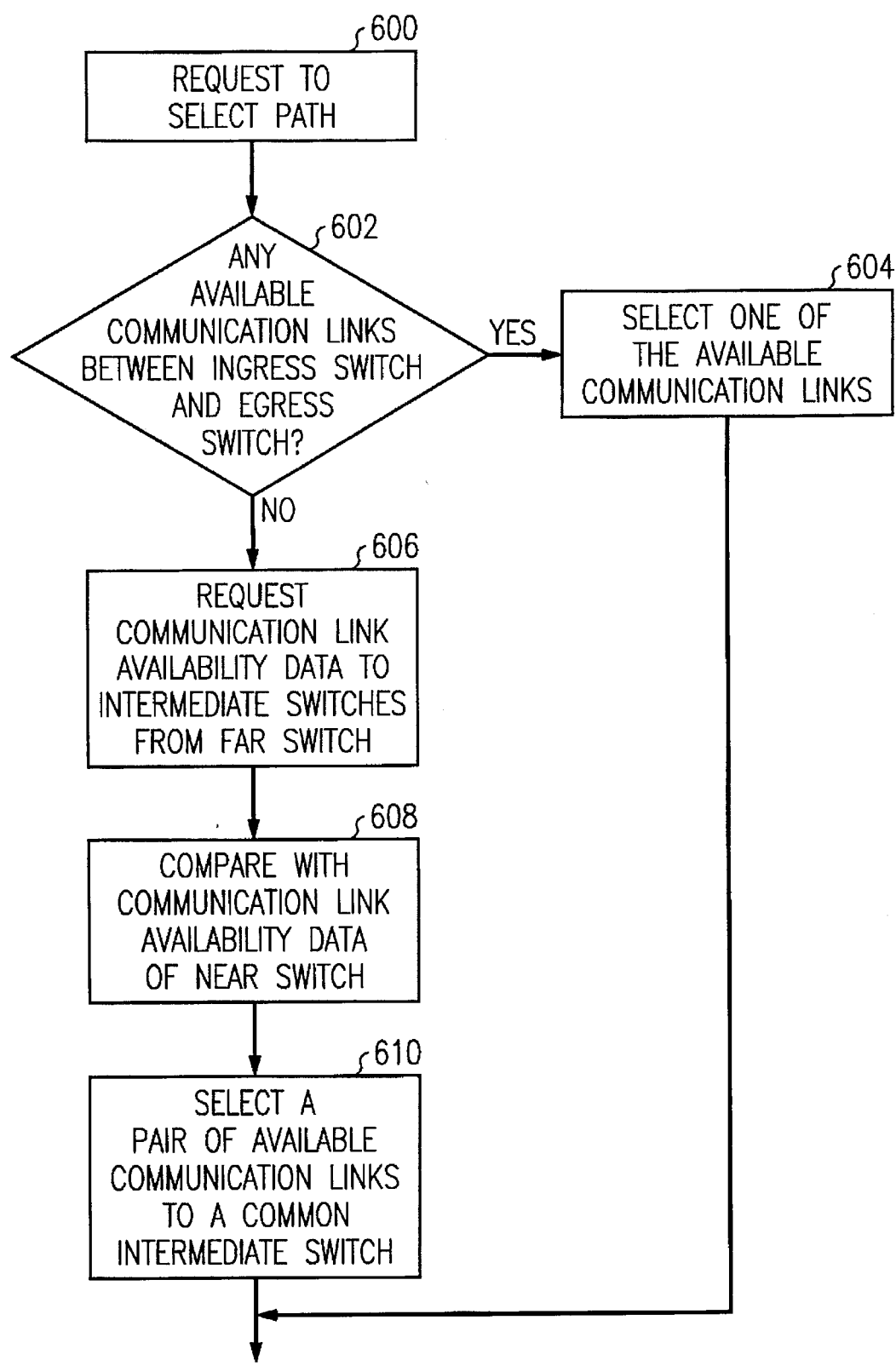
FIG. 7 illustrates the process of selecting a path within a symbiotic network.

FIG. 7 illustrates the process of selecting a path. Block 600 indicates that a path is to be selected between an ingress port and an egress port (or between ingress port and a supplementary port, such as an intelligent peripheral, associated with a supplementary process). Test 602 is used to determine whether any communication links between the ingress switch and the egress switch are available. If so, one of the available communication links is selected for this path (action block 604). If no communication links are available between the ingress and egress switches, then communication link availability data is requested for links between intermediate switches and the far switch. (For the purposes of this flow chart the near switch is the one requesting that a path be selected.) This communication link availability data is then compared with communication link availability data of the near switch (action block 608) and a pair of available communication links to common intermediate switch is selected (action block 610). This procedure is very similar to the procedure described for real time network routing in U.S. Pat. No. 5,101,451; the symbiotic network is of course likely to be much simpler than a toll network so that access information to relatively few intermediate switches will have to be examined.

In the unusual case where there are no two-link paths available between the ingress and the egress switch, a link may be selected to an intermediate switch having two link paths available to the far end switch and, using that switch as a near end switch, the actions of blocks 606, 608 and 610 can be executed.

Figure 8:
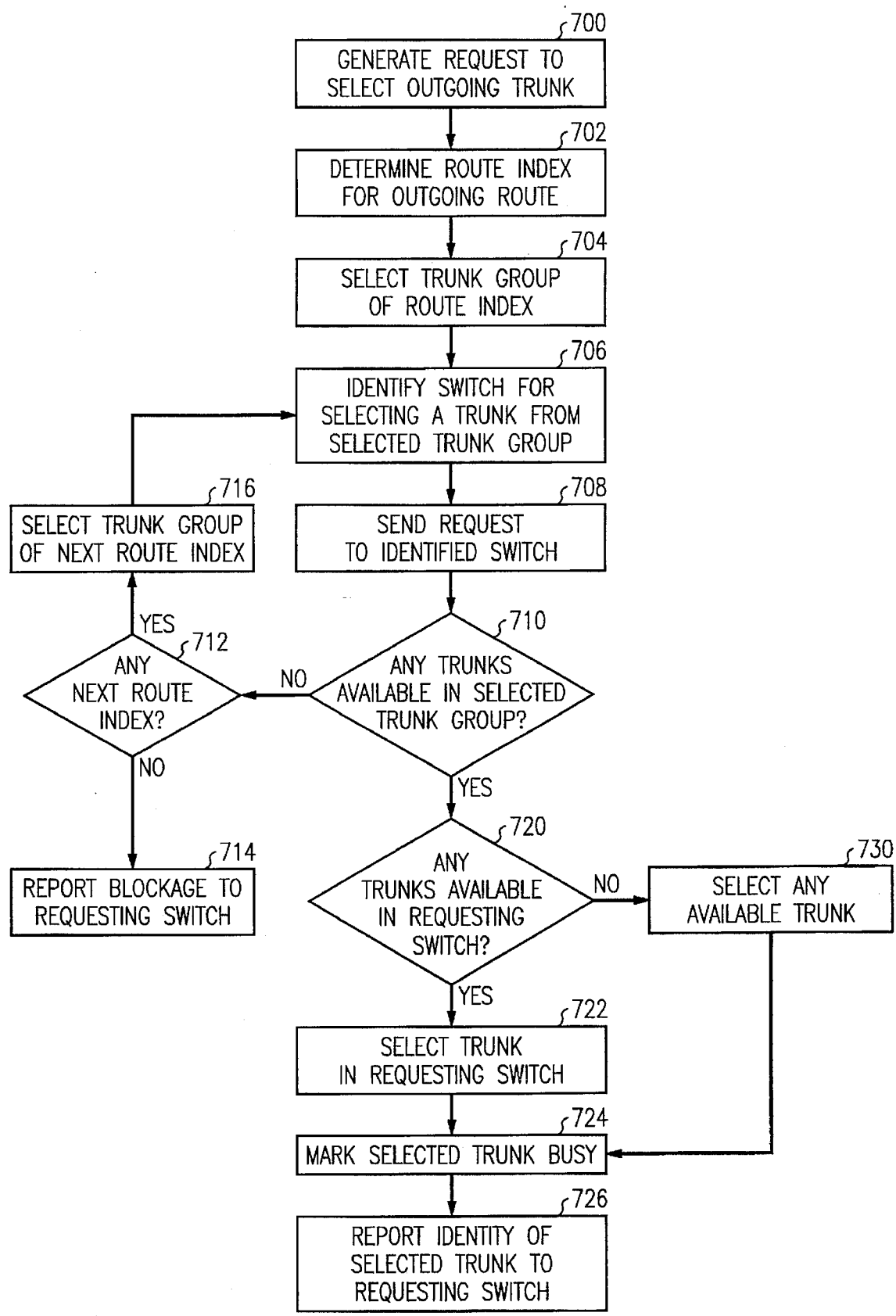
FIG. 8 illustrates the process of selecting an outgoing trunk from a symbiotic network.

One of the advantages of the symbiotic network is that outgoing trunks for the network may be efficiently shared among all the switches of the symbiotic network. FIG. 8 illustrates the process of selecting an outgoing trunk from the symbiotic network. According to principles of the prior art, the first step in selecting an outgoing trunk is to find a route index for routing a call to a destination. A route index is well known in the prior art and is described for example in W. Ulrich, et. al: "Translations In The No. 1 Electronic Switching System", *Bell System Technical Journal*, pp. 2542–5, September 1964. Such a route index provides an identification of a trunk group and the identification of an alternate route index if that trunk group is not available. By stringing together route indexes, a highly flexible routing arrangement may be implemented. While not all switching networks use the exact format of a route index, something comparable is needed in order to have the flexible routing arrangement. As a first step for routing an outgoing call, it is necessary to determine a route index for the outgoing route. The trunk group of the route index is selected (action block 704). Action block 706 is used to identify the switch for selecting a trunk from the selected trunk group. For ease of selecting a trunk in a trunk group, a single switch is used for making this selection. This single switch maintains a record of which trunks are available in order to be able to make a selection. The request to select a trunk from the selected trunk group is then sent to the identified switch (action block 708). Test 710 is then used to determine if any trunks are available in the selected trunk group. If not, test 712 is used to determine whether there is a next route index or simply a route index indicating no more trunks available and perhaps describing the blockage treatment. If no more trunks are available, then blockage is reported to the requesting switch (action block 714). If there is a next route index, then action block 716 is used to select a trunk group of the next route index and the action bock 706 is reentered.

If trunks are available in a selected trunk group as indicated by a positive result in test 710, then test 720 is used to determine whether any trunks in that group are available in the requesting switch. If so, then a trunk in the requesting switch is selected (action block 722), the selected trunk is marked busy (action block 724), and the identity of the selected trunk is reported to the requesting switch (action block 726). If no trunks are available from the selected trunk group and the requesting switch, then any available trunk in the selected group is selected (action block 730) and the actions previously described of action block 724 and 726 are executed.

The trunks of a single trunk group can go to a plurality of different switches of a destination symbiotic network, since the traffic from any trunk can be readily switched to any terminating line of that network.

FIG. 9 is a flow diagram illustrating the process of selecting an egress port for a call to a multi-line hunting group (action block 800). Such a multi-line hunting group might be for example a group of agents of an automatic call distributor that served calls to a particular telephone number. First the identity of the switch for selecting an egress port for that multi-line hunting group must be determined (action block 801). A single switch is used for selecting the egress port for essentially the same reasons that a single switch is used for selecting a trunk in a trunk group as discussed above with respect to FIG. 8. The request to select the egress port is transmitted to the identified switch (action block 802). The identified switch responds with the identity of the egress port and the identity of the switch to which that egress port is connected (action block 804) An egress process is then established with the egress port in the switch of that egress port (action block 806) and the ingress and egress process are linked (action block 808).

Figure 10:
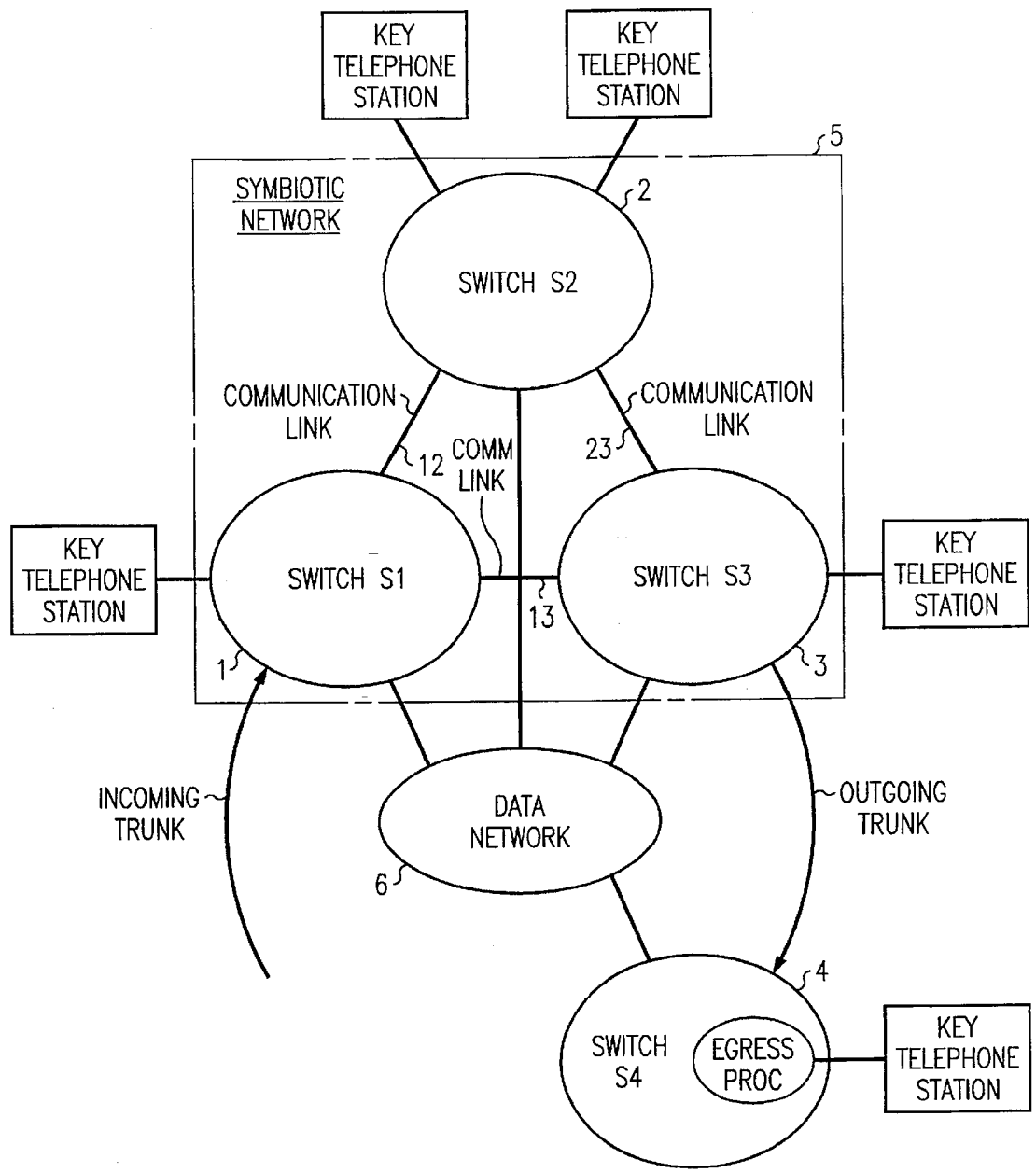
FIG. 10 illustrates a symbiotic network used to control a key telephone system with key telephone stations connected to a plurality of switches of the symbiotic network and to one switch outside the symbiotic network.

An example of the usefulness of a symbiotic network is a distributed key telephone system having stations connected to a plurality of the switches of the symbiotic network (FIG. 10). Each key telephone station has a display for indicating the status (busy, idle, ringing, hold) of certain other stations, and indications of incoming calls. The key stations also have buttons or keys to allow a station to pickup an incoming call, join a conversation, disconnect from a call or place a call on hold. In a modem key telephone system, the station has a single communication path to its connected switch, and a two way data link to receive signals for controlling its display, and to transmit signals representing the operation or release of the keys or buttons. The objective is to allow a station to pickup calls on any of a small plurality of equivalent line appearances, and to monitor the status of these line appearances. Thus, for example, a secretary may monitor the telephones of one or more principals, and answer calls when the principals do not do so. Autonomous key telephone systems are expensive but the equivalent of key telephone service can be provided from a switching system, and, in accordance with the principles of this applicant's invention, from a symbiotic network. When all stations are idle, no processes are required. However, when an incoming call for any station of the key telephone system is received or when any of the key telephone system stations originates a call, processes are established for each key telephone station. These processes control transmission of display control signals to their associated key telephone station and receive indications of the operation or release of buttons or keys from their associated station. Each station control process communicates with the control processes of the other stations in order to update the displays of these other stations in response to operations or release of push buttons or keys by its associated key telephone station. When an incoming call is received, all stations receive the display control signals and a selected station receives in addition ringing signal when any station operates a key or push button. To answer the incoming call in conjunction with going off hook, a symbiotic network connection is established from then incoming trunk to that station. If another station also picks up, a conference connection is established between the incoming trunk and the two stations.

In an alternative embodiment, a path is established to a lead station as soon as the call is received, which path stays up during the ringing interval. If another station answers, the call is then redirected to that other station. In one arrangement, the lead station is the one that answered the most recent call.

Each key telephone station has its outgoing signals detected in the connected switch, and these signals are transmitted as messages to the control processes for each station of the key telephone system for transmission to the associated key station. Similarly, incoming call requests have their corresponding lamp control messages sent to these control processes.

Figure 11:
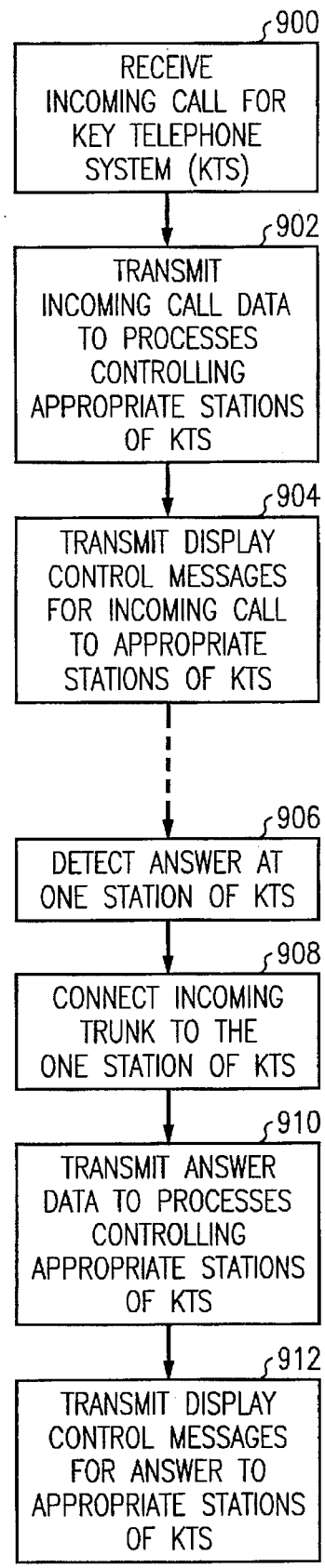
FIG. 11 is a flow diagram of the method for controlling the key telephone system of FIG. 10.

FIG. 11 is a flow diagram illustrating the processing of a key telephone system call. An incoming call for the key telephone system is received (action block 900). The ingress process is assigned to the incoming trunk and under the control of this ingress process incoming call data is transmitted to the processes controlling the appropriate stations of the key telephone system (action block 902). Translation information stored for the key telephone system in one or more of the switches of the symbiotic network is accessed in order to identify which key telephone stations are to receive calls for the called number. The processes associated with these key telephone stations are either established and made active or are already active since key telephone stations are informed of calls answered by other stations. These processes then transmit to their associated key telephone stations, display control messages for indicating to these stations that an incoming call has been received (action block 904). In some cases the message will be not only a display control message, but also a message to cause an alerting signal to be generated at the key telephone station. When one of the key telephone stations subsequently answers the call, that key telephone station sends a message to the switch to which it is connected and this message is routed to the control process for that key telephone station (action block 906). This process then becomes an egress process for this call and in cooperation with the ingress process associated with the incoming trunk causes a connection to be established between the incoming trunk and the answering station of the key telephone system (action block 908). The answer data is transmitted to the processes controlling the other stations of the key telephone system which need to know about the answer (action block 910). These processes then transmit display control messages for the answer to the appropriate stations of the key telephone system (action block 912).

A key telephone station of a key telephone system that is not connected to a switch of the symbiotic network may still be served basically by the symbiotic network. The distinction here is that when a connection is to be made, the connection must be made from a switch of the symbiotic network via a trunk to a switch of the key telephone switch, switch S4 in this case. The control of signaling messages among the members of the key telephone system is otherwise the same. The translation data for the key telephone stations must identify the key telephone station attached to the outside switch. The ingress process in the symbiotic network and the egress process in the outside switch communicate directly via the signaling network 6. Effectively, the key telephone station attached to switch S4 is part of a virtual symbiotic network that includes the real symbiotic network 5. Virtual symbiotic networks are discussed hereinafter with respect to FIGS. 13–15.

Figure 12:
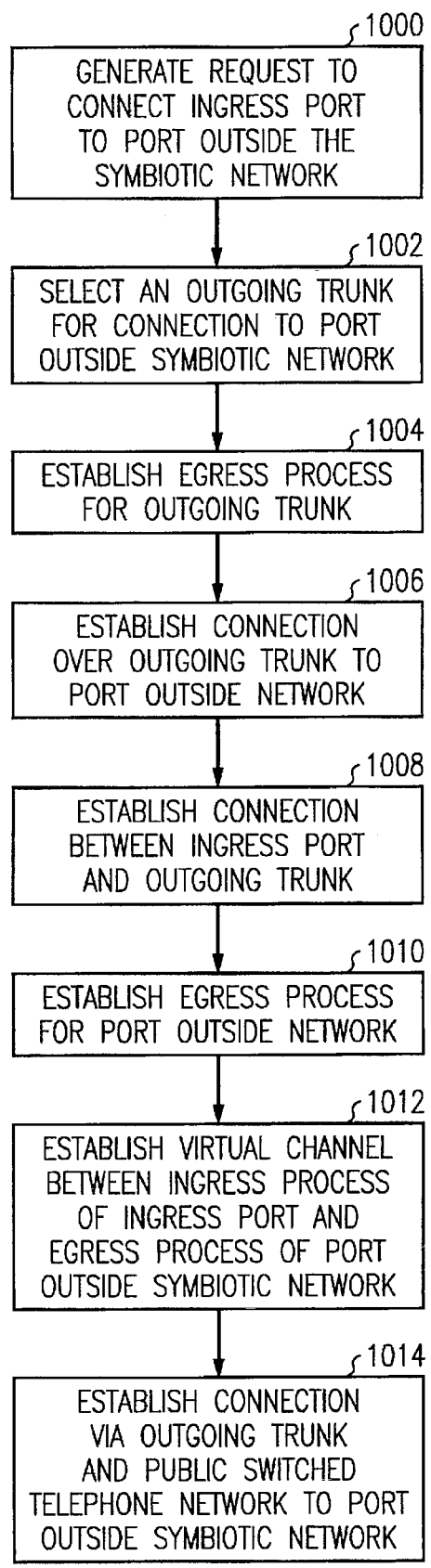
FIG. 12 illustrates the process of making a connection between a port of a symbiotic network and a port outside the symbiotic network; essentially the same process can be used to establish connections within a virtual symbiotic network.

An enhanced path selection and connection routine must be used. The enhancement is illustrated in FIG. 12 which shows that a request is generated to connect ingress port to a port outside the symbiotic network (action box 1000). First, an outgoing trunk is selected for the connection to the port outside the network using the methods of selecting an outgoing trunk previously described (action box 1002). An egress process is established for the outgoing trunk (action box 1004) and a connection is established between the other end (an incoming end) of that trunk and the terminating port outside the network using conventional call setup procedures (action box 1006). Also, a connection is established between the ingress port and the outgoing trunk (action box 1008). The informational and control signaling for the key telephone station is carried out between the process for the key telephone station connected outside the symbiotic network and the other key telephone station processes in the same way as it is carried out when all key stations are in the symbiotic network.

Switch S4 establishes an egress process for controlling its connected key telephone station (action block 1010). The egress process on switch S4 and the ingress process connected to the ingress port are then connected by a virtual signaling channel carried over data network 6 (action block 1012). A connection is established via an outgoing trunk from symbiotic network 5 going directly or via the public switched telephone network to switch S4, and a connection to the key telephone station is established in switch S4 (action block 1014).

As defined herein, a symbiotic network comprises a group of switches each of which can access data in any of the switches of the group. The switches are connected by communication links and each switch has access to availability data of these communication links. A single two-way trunk group or two one-way trunk groups can be used to interconnect two symbiotic networks, since each such network acts essentially as one switch; the individual trunks of the group can connect any of the switches of one symbiotic network with any of the switches of the other symbiotic network.

In some cases, it may be desirable to use more than one trunk group to connect a symbiotic network to a common destination. For example, a separate trunk group may be reserved for 911 traffic to ensure that emergency calls can be completed even if the public network is overloaded. A business may buy a trunk group to which its own traffic is restricted.

Many of the advantages of a symbiotic network are obtained in a virtual symbiotic network by providing virtual channels for communication between ingress and egress processes of connections to switches that are not in the same symbiotic network. For example, such a virtual channel can be used to control a key telephone station connected to a switch, or another symbiotic network, outside the original symbiotic network. Effectively, in FIG. 10 all the key stations connected to switches S1, S2 and S3 are part of symbiotic network 5. The key station connected to switch S4 is part of a virtual symbiotic network with the other key telephone stations. Virtual symbiotic networks are especially useful for serving the stations of a single customer, the station being scattered over several switches, each of the several switches being used largely or primarily for serving other customers. Such a virtual symbiotic network is implemented through translation data in each of the switches of the virtual symbiotic network; this translation data indicates that when a connection is set up between stations of the virtual symbiotic network, a virtual channel is established between the control processes of the stations to allow data for enhanced call features to be exchanged. The translation information can indicate that a given station is a member of more than one virtual symbiotic network.

Symbiotic networks and virtual symbiotic networks are ideal vehicles for implementing Centrex type features whenever the stations of the sharing Centrex features are distributed over a plurality of switches. The facility of a virtual channel for signaling between ingress and egress processes on different switches allows the data for the Centrex to be commonly accessed and exchanged between these switches.

Foreign exchange service can be provided efficiently and at low cost using the facilities of a symbiotic network or virtual symbiotic network. For example, the foreign termination is given a class of service which defines it as one member of a virtual symbiotic network, the other member being the local termination. If the two terminations are part of a symbiotic or virtual symbiotic network, foreign exchange service can be provided even more easily since the terminals of the symbiotic network operate as if they were on a common switch.

Symbiotic networks are a convenient way of locating telephone operators and their associated operator assistance switches remotely from a centralized operator assistance switch. The operator assistance switches can be combined into one symbiotic network. Operators working from home or from scattered locations can be combined into a virtual symbiotic network and derive many of the benefits of being in a single symbiotic network.

Specialized circuits such as IP 24 may be included in a virtual symbiotic network, for example, with the stations sharing Centrex features, or with the stations of a symbiotic network, so that larger groups of such circuits may be physically located, and controlled, together, and may share common resources; for example, many speech recognition front end circuits can share one bulk memory.

The switches of a large cellular telecommunications network can be combined into a single symbiotic network. This simplifies the problem of "handing off" traffic from one cellular mobile switch to another when the connected mobile moves from one area to another.

Figure 13:
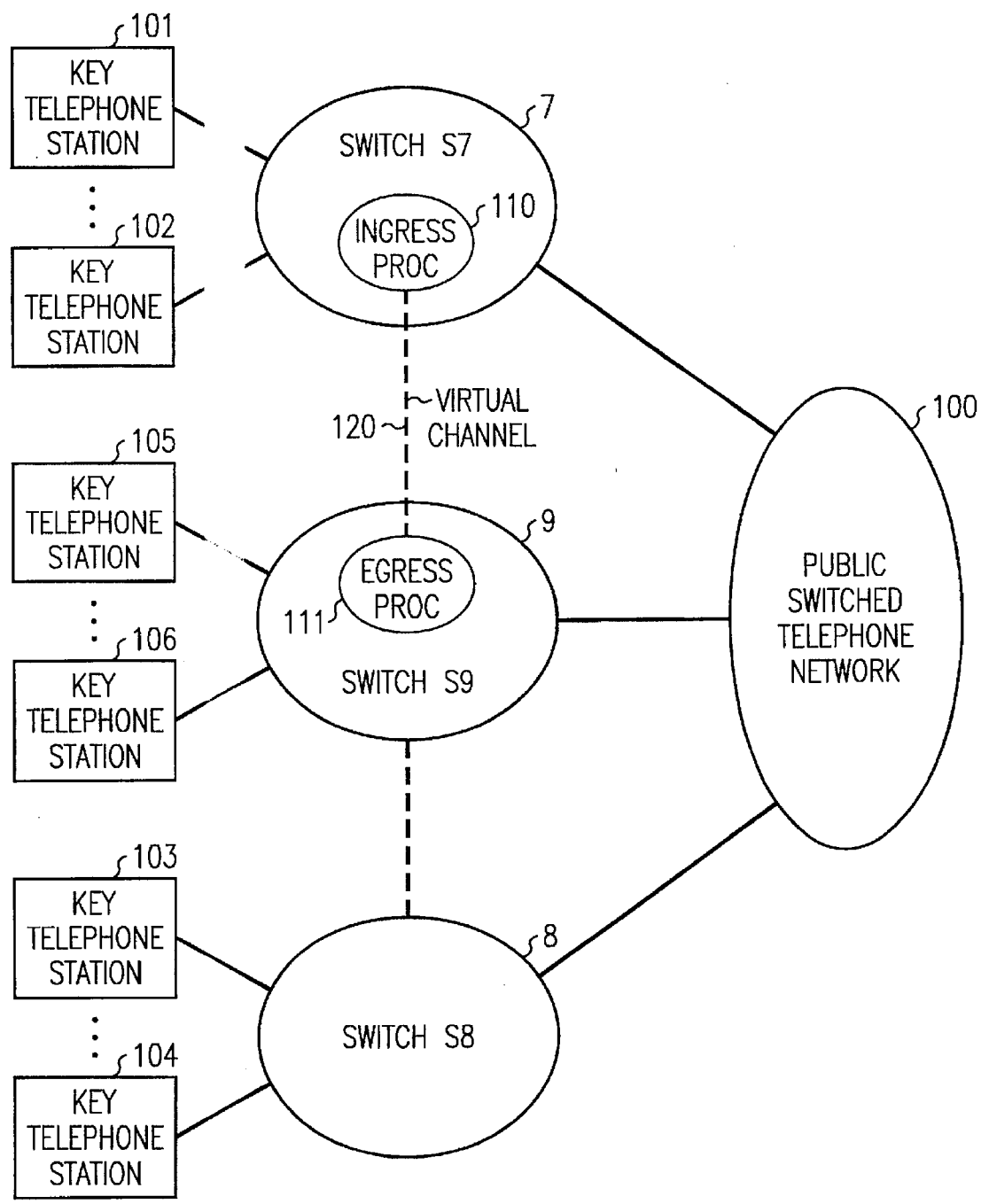
FIG. 13 illustrates a virtual symbiotic network.

FIG. 13 illustrates a virtual symbiotic network. The network comprises three switches S7, S8, . . . , S9 each connected to a plurality of telephone stations 101, . . . , 102; 103, . . . , 104; and 105, . . . , 106; respectively. The switches are interconnected by the public switched telephone network 100. Each switch may contain lines which are not part of the virtual symbiotic network. When a connection is made between stations on the virtual symbiotic network, (i.e., one of the stations 101, . . . , 102; 103, . . . , 104; and 105, . . . , 106,) an ingress process 110 is associated with the originating station and an egress process 111 is associated with the terminating station. A virtual channel 120 is established between the ingress process and the egress process to permit these processes to exchange data and to access data in the switches in which each of these processes reside.

Figure 14:
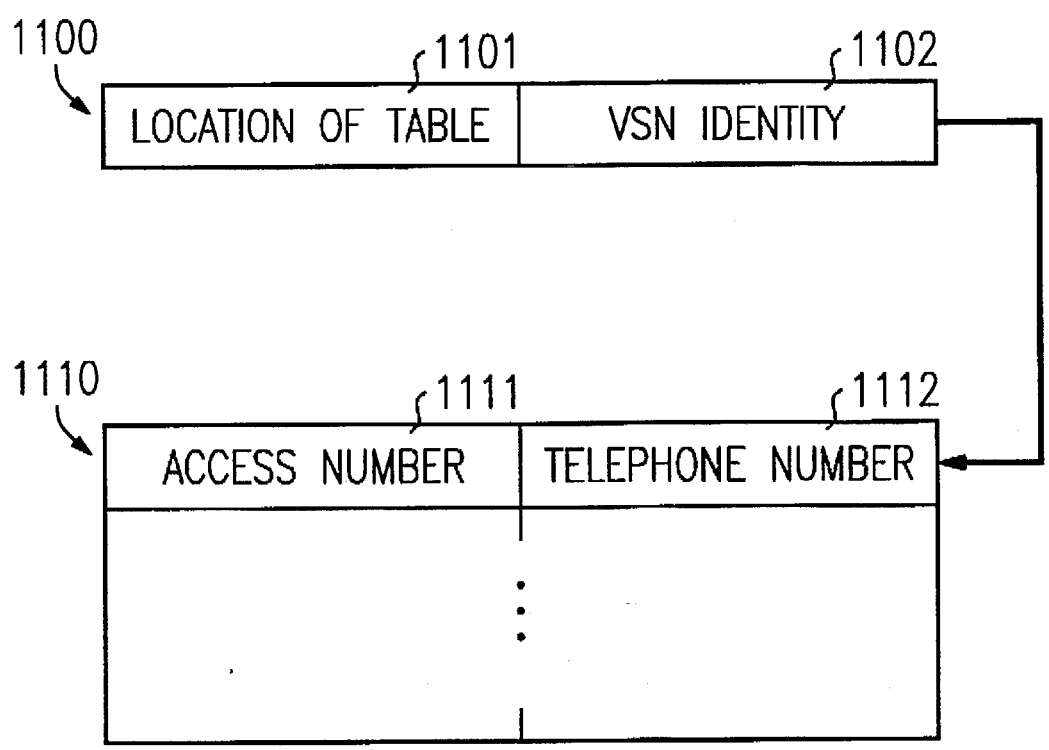
FIG. 14 illustrates data for implementing a wide area Centrex using a virtual symbiotic network.

FIG. 14 illustrates some of the translation information that is required to implement a virtual symbiotic network, in this case, for Centrex type service. The primary translation entry for one of the stations on the symbiotic network, entry 1100, includes data for locating a supplementary table 1101, and an identification of the virtual symbiotic network 1102. The data for locating may be a direct or indirect address, or, especially if the table is located in another switch, a key for locating that table; the key may be tied to the identification of the virtual symbiotic network. Table 1110 is a table to translate between the access number (typically an abbreviated number dialed by a Centrex extension) and a conventional telephone number 1112 for routing the call to the station specified by the access number 1111.

Figure 15:
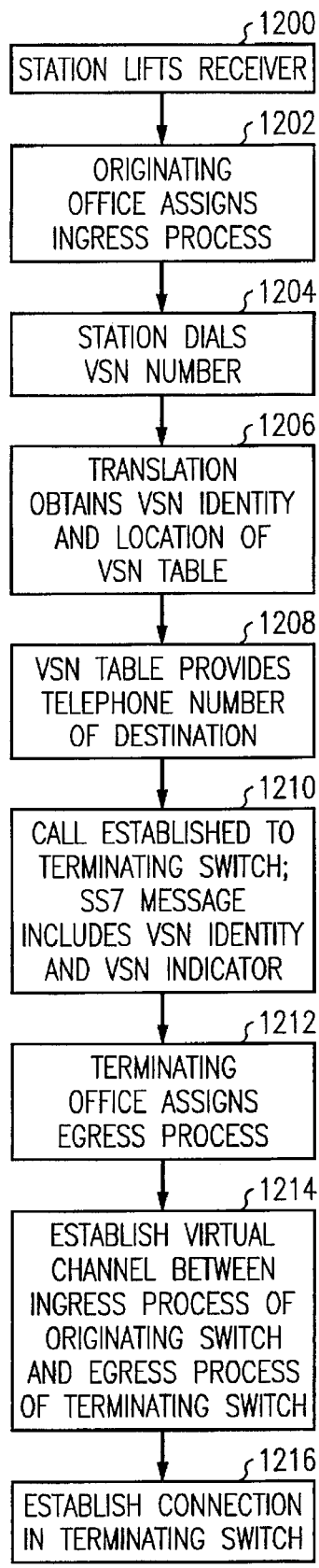
FIG. 15 illustrates the process of establishing a call in a virtual symbiotic network.

FIG. 15 illustrates the process of establishing a call in a virtual symbiotic network. The process of establishing a call begins when the originating station lifts its receiver (action block 1200). The originating office assigns an ingress process to the call (action block 1202). The station dials a virtual symbiotic network number (in this case, a Centrex number) (action block 1204). The translation data of the originating switch illustrated in FIG. 14 provides the virtual symbiotic network identification and an address of the virtual symbiotic network table (action block 1206). The virtual symbiotic network table provides the telephone number of the destination (action block 1208). (A full telephone number is used to simplify the routing of the call.) The call is then established to the terminating switch but the SS7 signaling message used to establish the call includes a virtual symbiotic network indicator and the identification of the virtual symbiotic network (action block 1210). While the preferred embodiment uses SS7, alternative signaling arrangements can be used instead. For example, a proprietary message standard could be used in order to avoid modifications of the standards governing SS7. The terminating office assigns an egress process (action block 1212). A virtual channel is then established between the ingress process of the originating switch and the egress process of the terminating switch (action block 1214). This allows these two switches to exchange all information necessary for implementing the specialized service. The connection in the terminating switch is established under the control of the egress process (action block 1216). The control and exchange of information between the ingress and egress processes can, for example, be used to reroute the call to another station of the virtual symbiotic network in another switch.

In an alternative embodiment, a call setup request message can be sent to the terminating switch (or a switch containing data for selecting an available member of a multi-line hunt group) in advance of establishing any connections so that a busy test can be performed and a line seized before a voice connection is established.

While in FIG. 10, the key telephone stations connected to switches S1, S2 and S3 are part of a symbiotic network, they can also form all or part of a virtual symbiotic network with the control processes for each station communicating by virtual data channels and with the switches interconnected as discussed for FIG. 13. The key telephone stations in either event can be part of a larger customer network such as a Centrex network.

Figure 16:
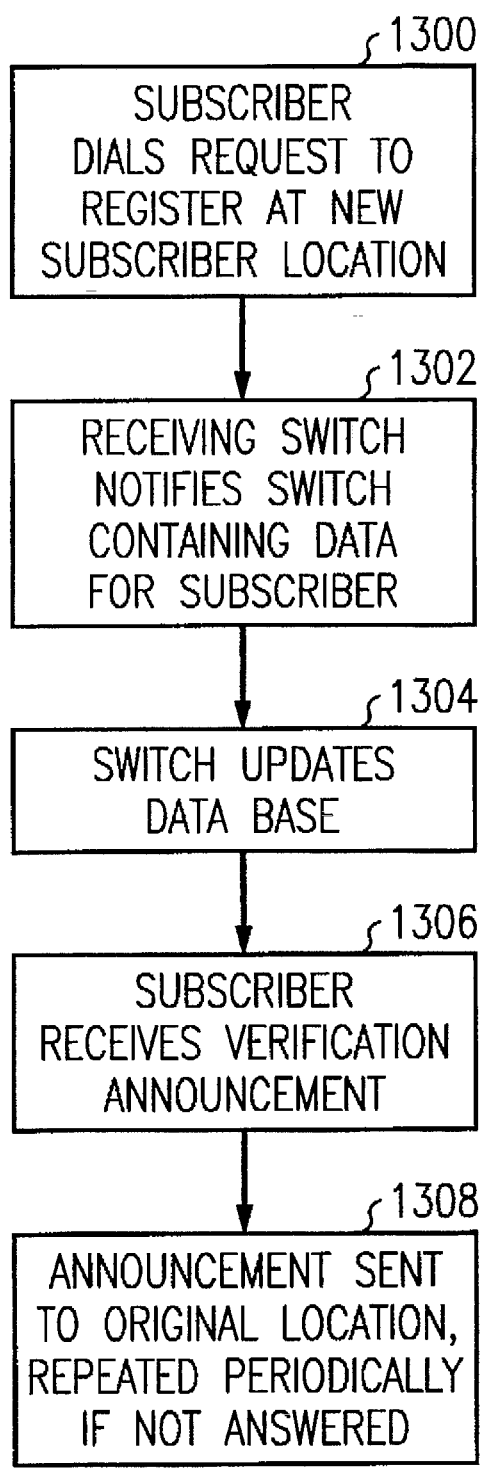
FIG. 16 illustrates the use of a symbiotic network for number portability.

FIG. 16 illustrates another application of symbiotic network for number portability. By number portability, in this case is meant the ability to switch a customer station from one line termination associated with one location to another termination associated with a different location. In the specific embodiment shown in FIG. 16, a subscriber dials a request to register at the new location (action block 1300) Such a request should include information to identify the subscriber's telephone number and privacy data such as a personal identification number to ensure that an outside individual cannot effectively intercept calls for that subscriber by taking on the directory number of that subscriber. The receiving switch verifies the personal identification number from the data base for the subscriber or for the customer from which the subscriber is a member and notifies the switch containing data for that subscriber (action block 1302). The switch then updates the data base (action block 1304). The subscriber receives a verification announcement (action block 1306) as a partial insurance against the misuse. An announcement is sent to the original location and is repeated periodically if no answer is received. (action block 1308). The attributes of the symbiotic network or a virtual symbiotic network including a port connected to the subscriber's new wall jack appearance make the movement of subscribers relatively straightforward because the data for the subscribers is effectively shared among the switches of the symbiotic or virtual symbiotic network.

A symbiotic network can be used to improve the reliability of service to specialized customers such as stockbrokers for whom loss of service can be devastating. First, the agents of the stockbroker can be distributed over a number of switches of the symbiotic network. Protection is obtained against the loss of any of these switches since incoming calls to any switch can readily be completed to any other switch of the symbiotic network. Secondly, trunk groups from other switches may be connected to more than one switch of the symbiotic network, so that if one switch fails, traffic can flow through the other switches. Third, the individual agents may be arranged to have key telephone stations connected to two switches with the connection to one of the two switches normally unused. Effectively, a symbiotic network is like one giant switch so that the failure of one of its switches is like the failure of only a segment of the giant switch.

FIGS. 17 and 18 show the partial contents of ingress and egress processes and controlled processes respectively. An ingress/egress processes (FIG. 17) includes the identification of the port controlled by the process, identification of the port at the other end, of a connection (i.e., the identification of the terminating line of a line port or a trunk port connected to the symbiotic network, not at intra-symbiotic network port.) The ingress/egress process also includes links to other control processes, supplementary processes, and controlled processes. Also included is the called directory number, path information for the call, and data describing the characteristics of the trunk or line connected to the port. In contrast, a controlled process (FIG. 18) only contains the identity of the associated port and the port connected by the switch of the controlled process to that port. While it may be desirable to also have information, for reverse linkage in order to be able to notify the controlling processes, (i.e., the ingress and/or egress processes) of failures in network connections for the purposes of establishing and disconnecting calls the specified data appears to be all that is necessary.

The techniques discussed herein for the symbiotic network can be used individually or in combination for a virtual symbiotic network. Some of the techniques can be applied to only a portion of the lines of a switch, such as the lines for a particular customer. For example, if a call involves a line of such a customer, the data access arrangements of FIGS. 4 and 5 can be used to access a master data base for the customer; the switch representing the data access must know the identity of the switch that contains this master data base (which includes a table such as table 1110 of FIG. 14) and stores that identity in its data base. The use of combined trunk groups such as 41 and 51 can be used for private trunk groups interconnecting switches of such a customer to provide greater diversity of facilities to protect against trouble or disaster conditions. The technique of an advance request for a busy test or an advance selection of an available line of multi-line hunt groups as described in FIG. 9 can be used in such arrangements to avoid establishing unnecessary connections.

The technique of FIG. 7 can be used in conjunction with private trunks dedicated permanently or through a software defined network interconnecting switches of a virtual symbiotic network. Similarly, the techniques of FIG. 8 can be used to select a private trunk (dedicated permanently or through a software defined network) interconnecting switches of a virtual symbiotic network.

In the preferred embodiment, the virtual channels between processes are channels on a permanent virtual channel between the switches of these processes. In addition, the switches themselves use virtual channels over such permanent virtual circuits to communicate between the controls of these switches.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. In a telecommunications network comprising a plurality of stand-alone switches, said plurality of stand-alone switches being interconnected by a data network for transmitting data messages among said plurality of stand-alone switches, a method of controlling a plurality of associated key telephone stations within a set of said plurality of stand-alone switches, said plurality of associated stations connected to a plurality of said switches, comprising the steps of:

grouping the set of said plurality of stand-alone switches into a symbiotic network;

responsive to receipt in a first of the set of said switches of a call on a line or an incoming trunk for ones of said plurality of associated stations, transmitting first display control data messages, over said data network, to second ones of the set of said switches connected to said ones of said stations, to control displays of said ones of said stations;

responsive to receipt of said first messages in said second one of said switching systems, transmitting display control messages from said second ones of said switching systems to said ones of said stations;

responsive to receipt from one of said stations in any of the set of said switches of a message indicating a request to answer said call, transmitting over said data network, a request to said first of said switches to establish a connection from said line or incoming trunk to said one of said stations; and establishing a connection from said incoming trunk to said one of said stations.

2. The method of claim 1:

wherein one additional key telephone station is connected to an additional switch, said additional switch being outside said symbiotic network;

wherein transmitting first display control data messages comprises transmitting first display control data messages to said additional switch;

wherein the step of transmitting display control messages comprises the step of transmitting display control messages from said additional switch to said one additional key telephone station;

wherein the step of transmitting a request to said first of said switches comprises:

responsive to receipt from said one additional station of a message indicating a request to answer said call, transmitting a request to said first of said switches to establish a connection from said incoming trunk or line to said additional switch and establishing a connection in said additional switch to said one additional key telephone station.

3. In a telecommunications network comprising a plurality of stand-alone switches, said plurality of stand-alone switches being interconnected by a data network for transmitting data messages among said plurality of stand-alone switches, a method of controlling a plurality of associated key telephone stations within a set of said plurality of stand-alone switches, said plurality of stand-alone switches, said plurality of associated stations connected to a plurality of said switches, comprising the steps of:

grouping a set of ports comprising ports of said plurality of associated key telephone stations, into a virtual symbiotic network;

responsive to receipt in a first of said switches of a call on an incoming trunk or line for ones of said plurality of associated stations, transmitting first display control data messages over said data network to second ones of said switches connected to said ones of said stations to control displays of said ones of said stations;

responsive to receipt of said first messages in said second ones of said switching systems, transmitting display control messages from said second ones of said switching systems to said ones of said stations;

responsive to receipt from one of said stations in any of said switches of a message indicating a request to answer said call, transmitting over said data network, a request to said first of said switches to establish a connection from said incoming trunk or line to said one of said stations; and establishing a connection from said incoming trunk or line to said one of said stations.

4. A stand-alone telecommunications switch, connected to a plurality of other stand-alone switches by a data network for transmitting messages between said switch and said plurality of other switches, comprising:

processor means, responsive to receipt of a call on an incoming trunk or line for ones of a plurality of key telephone stations some of which are connected to other ones of said plurality of stand-alone switches, for controlling transmission over said data network of first control display data messages to ones of said plurality of other switches to control displays of ones of said stations;

further responsive to receipt over said data network from one of said plurality of other switches of a message indicating a request to answer said call, controlling an extension of a connection from said incoming trunk or line toward said one of said plurality of other switches; and further responsive to receipt of first control display data message from another switch of said plurality of other switches for controlling transmission of a display control message to ones of said key telephone stations connected to said switch, and responsive to an answer message from a key telephone station connected to said switch for controlling transmission over said data network of another message indicating a request to answer a call.

* * * * *